(12) United States Patent
Mathy

(10) Patent No.: US 8,371,066 B2
(45) Date of Patent: Feb. 12, 2013

(54) WATER STORAGE DEVICE FOR GROWING A LAWN SURFACE

(75) Inventor: Bernard Mathy, Bellignat (FR)

(73) Assignee: PRM (FR)

( * ) Notice: Subject to any disclaimer, the term of this patent is extended or adjusted under 35 U.S.C. 154(b) by 743 days.

(21) Appl. No.: 10/547,144

(22) PCT Filed: Feb. 25, 2004

(86) PCT No.: PCT/FR2004/000423
§ 371 (c)(1),
(2), (4) Date: Jul. 24, 2006

(87) PCT Pub. No.: WO2004/075628
PCT Pub. Date: Sep. 10, 2004

(65) Prior Publication Data
US 2007/0130828 A1    Jun. 14, 2007

(30) Foreign Application Priority Data

Feb. 25, 2003 (FR) .................................. 03 02289

(51) Int. Cl.
*A01G 9/02*    (2006.01)
(52) U.S. Cl. ............................. 47/66.5; 47/65.9; 47/79
(58) Field of Classification Search ............ 47/66.5, 47/82, 83, 65.9, 85–87, 66.1, 84, 73–75, 47/77
See application file for complete search history.

(56) References Cited

U.S. PATENT DOCUMENTS

| 3,009,291 | A | * | 11/1961 | Blackmore ..................... 47/87 |
| 3,386,608 | A | * | 6/1968 | Diller ........................ 220/23.6 |
| 3,660,934 | A | * | 5/1972 | Pollack et al. ................ 47/84 |
| 3,751,852 | A |   | 8/1973 | Schrepper |
| 6,253,487 | B1 |   | 7/2001 | Yoshida et al. |
| 6,536,361 | B1 | * | 3/2003 | Wu ........................... 111/114 |
| 2002/0005012 | A1 | * | 1/2002 | Cochran ..................... 47/66.5 |

FOREIGN PATENT DOCUMENTS

| EP | 0 321 741 |   | 6/1989 |
| FR | 2 245 276 |   | 4/1975 |
| GB | 2 085 702 |   | 5/1982 |
| GB | 2093326 A | * | 9/1982 |
| JP | 11127692 A | * | 5/1999 |
| JP | 2002136228 A | * | 5/2002 |
| WO | WO 00/64253 |   | 11/2000 |

OTHER PUBLICATIONS

International Search Report; PCT/FR2004/000423; Aug. 16, 2004.

* cited by examiner

*Primary Examiner* — Son T Nguyen
(74) *Attorney, Agent, or Firm* — Cantor Colburn LLP

(57) ABSTRACT

The invention relates to a device comprising a trough (2) with a base wall (4) and side walls (5), said trough (2) designed to contain a liquid and a tray (3) for placing in the trough (2), for supporting a growing substrate with at least one well (15), the bottom of which communicates with the liquid in the trough (2) each of which has an adjacent breaking zone (7, 12), the cutting of which permits the device to be divided up.

10 Claims, 6 Drawing Sheets

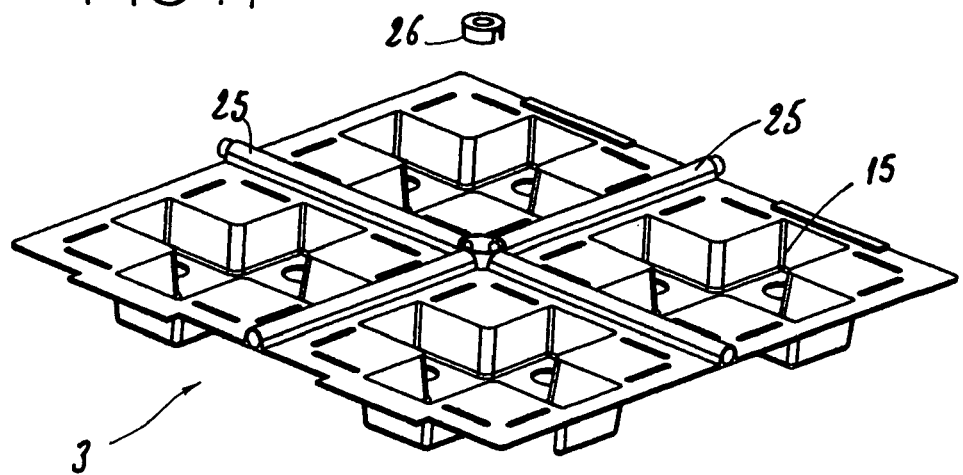
FIG 14
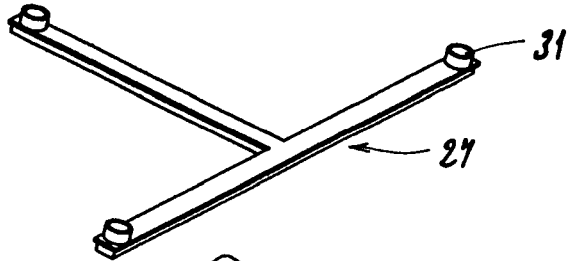
FIG 15
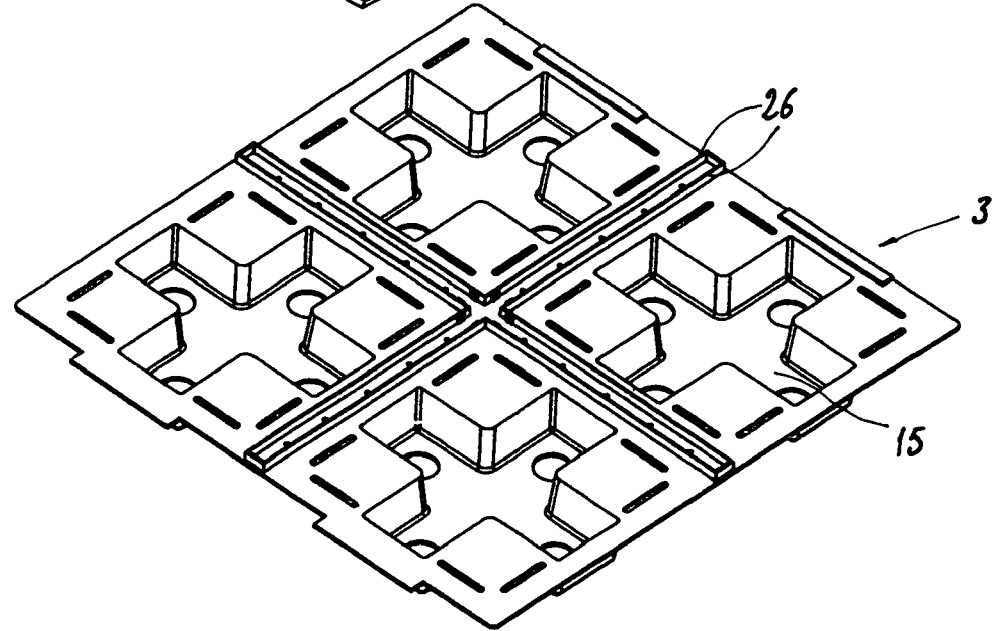

WATER STORAGE DEVICE FOR GROWING A LAWN SURFACE

TECHNICAL FIELD OF THE INVENTION

The present invention relates to a device with a store of water for growing a lawned surface.

BRIEF DISCUSSION OF RELATED ART

In arid regions such as the regions of the Mediterranean basin for example, growing lawned surfaces presents several problems.

This is because in these regions the layer of arable soil is thin, or even non-existent, and the very great heat in these regions means that watering has no appreciable effect because the water with which the lawn is watered evaporates almost immediately.

In addition, the sites where it may be desirable to cultivate or grow lawns, which are natural sites, therefore have a relief which is not always strictly flat and may exhibit certain obstacles such as trees for example.

BRIEF SUMMARY OF THE INVENTION

The invention proposes a device comprising a store of water for growing lawned surfaces which can be adapted to suit the unevenness of the ground on which it is placed.

To this end, the device according to the invention comprises:
  a trough having a bottom wall and side walls, the trough being intended to contain a liquid, and
  a tray fitting into the trough, intended to support a growing substrate and having at least one well the bottom of which communicates with the liquid contained in the trough.

According to the invention, the trough and the tray each have a frangible region facing one another, the severing of which allows the device to be divided.

By virtue of this arrangement, the device can be adapted to suit the unevenness of the ground.

According to one particularly advantageous characteristic, the bottom wall of the trough makes an angle of less than 90° with one of its side walls, which allows the device to be positioned on sloping ground.

According to a preferred embodiment, the frangible region formed in the trough is delimited by two partitions and the frangible region in the tray is delimited by two ribs.

As a preference, the trough has a square shape exhibiting two frangible regions connecting the middle of its two opposite sides and the tray has a square shape having two frangible regions connecting the middles of two opposite sides.

In order to allow the tray to lie better, the trough has a square shape exhibiting two frangible regions connecting the middles of two opposite sides and the tray has a square shape having two frangible regions connecting the middles of two opposite sides.

Advantageously, at least one notch is made in the upper part of the side walls of the trough, which makes it possible to ensure the continuity of the substrate when several devices are in contact with one another.

According to one possibility, at least one clip is fitted over the upper part of the wall, this clip resting against the tray.

In addition, slots are pierced in the bottom wall of the well.

In an alternative form of embodiment, at least one of the corners of the trough and of the tray has the shape of an arc of a circle.

According to an advantageous characteristic, the trough has, in at least one of its side walls, a nozzle and, in its wall opposite the latter, an opening equipped with a peripheral seal capable of accepting the nozzle when two troughs are placed next to one another. This characteristic allows water to communicate and circulate from one trough to the other.

Also, advantageously, the trough has, in at least one of these side walls, a cutout allowing water to pass from one trough to the other when two troughs are placed side by side.

For water management purposes, the tray has means for conveying water into a trough.

According to one embodiment, the frangible region of the tray consists of a U-section facing downward and. able to accept a water supply hose.

According to another embodiment, the frangible region of the tray consists of a pipe of which the part facing the trough has at least one opening.

According to the lie of the land on which the device is placed, the pipe connects the middles of the two opposite sides of the tray, or the pipe connects the middles of the consecutive sides of the tray.

The tray may also have two pipes in the shape of a cross. Advantageously, a selection valve is placed at the intersection of the pipes.

In another embodiment, the frangible region is delimited by ribs on able to accept a cover to define a water conveying duct.

In order to position the trough and therefore the device better, the underside of the trough is equipped with spikes.

Advantageously, the tray has, on one of its sides, a male interlock feature and, on its opposite side to the first, a female interlock feature which makes it possible to prevent the growing substrate from dropping into the trough when the device is in operation.

BRIEF DESCRIPTION OF THE DRAWINGS

For a full understanding thereof, the invention is described with reference to the attached drawing which, by way of nonlimiting example, depicts several embodiments of a device with a store of water according to this invention.

FIGS. 8 to 15 illustrate several variants of embodiment of the device.

DETAILED DESCRIPTION OF THE INVENTION

Figure 1:
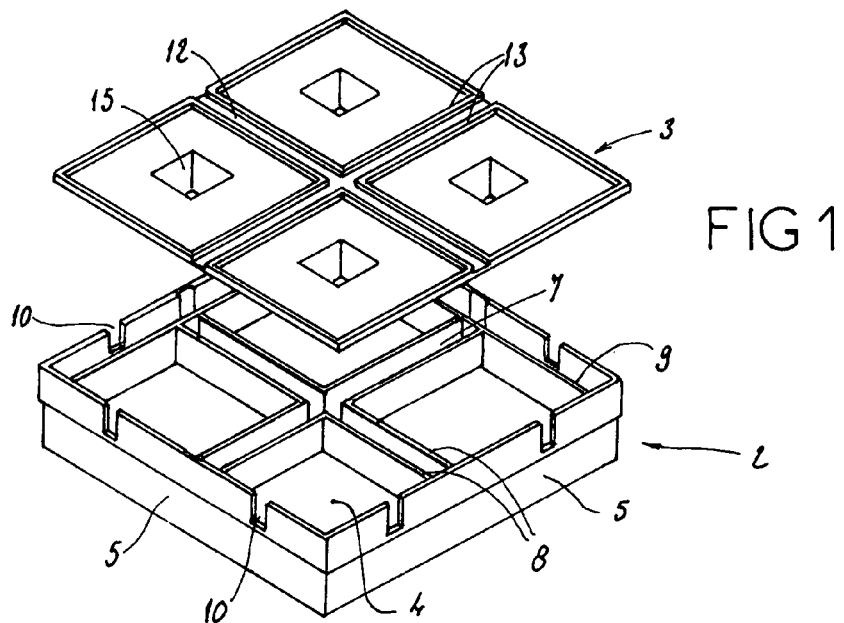
FIG. 1 is an exploded perspective view of one embodiment of this device.

Referring first of all to FIG. 1, it can be seen that the device with a store of water according to the invention comprises two elements, namely a trough 2 and a tray 3.

In the embodiment depicted in the drawing, the trough 2 has the shape of a square with a bottom wall 4 and four side walls 5.

The trough 2 also has a frangible region in the shape of a cross connecting the middles of two opposed lateral partitions. This frangible region 7 is delimited by two partitions 8 defining a cross between them.

It will also be noted that a shoulder 9 is formed in each of the side walls 5 of the trough 2. The shoulder 9 is situated at the same height as the upper end of the partitions 8.

Finally, it will be noted that the upper part of the side walls 5 has two notches 10.

As far as the tray 3 is concerned, the latter also has the shape of a square the dimensions of which allow it to sit within the trough 2.

The tray 3 also has a frangible region 12 connecting the middles of its opposite sides. The frangible region 12 is delimited by ribs 13, these ribs also extending over the periphery of the tray 3.

The tray 3 is also equipped with four wells 15 each one situated at the center of the four squares delimited by the frangible region of the tray 12. The bottom of each of the wells 15 is provided with slots 17.

Figure 3:
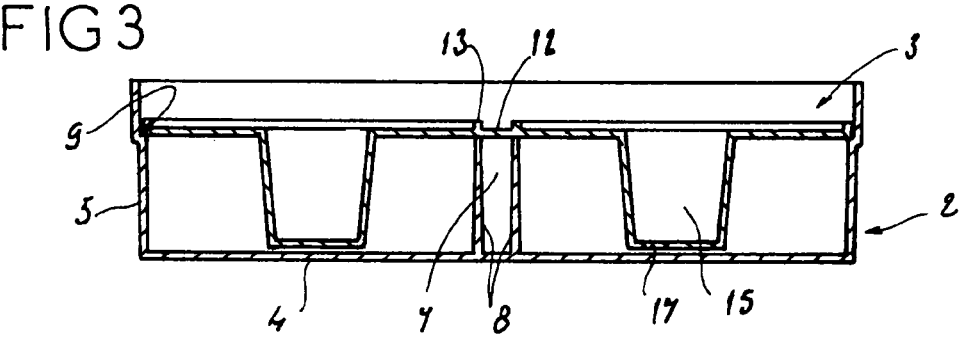
FIG. 3 depicts a view of the device in section.
Figure 4:
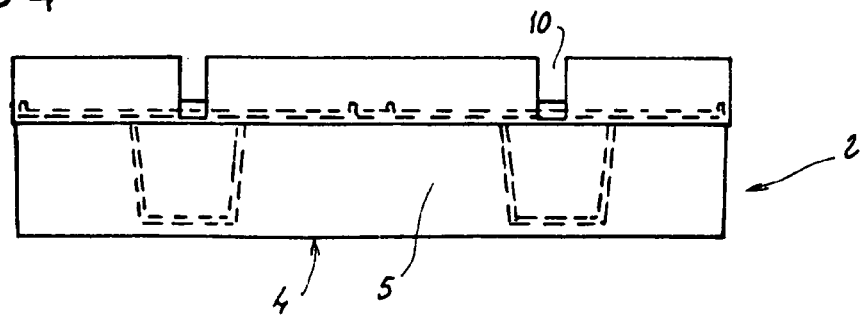
FIG. 4 depicts a side view.

The tray 3 is placed in the trough 2, the tray 3 rests, on the one hand, on the shoulder 9 and, on the other hand, on the end of the partitions 8 which delimit the frangible region 7 of the trough, as can be seen in FIG. 3.

To prevent the tray 3 from possibly riding up, clips 18 are fitted over the upper edge of the side walls 5.

When a lawned surface is to be produced in a region in which the layer of arable land is insufficient for those purposes or, when the temperature conditions mean that evaporation is very high, a sufficient number of devices to cover the desired area are placed in contact with one another.

A growing substrate which may be earth or compost or an appropriate mixture is placed on the trays 3 of each of the devices, this substrate is then leveled then compacted and may then be lawned or cultivated.

When this surface is watered, the excess water runs into the trough 2 by virtue of the slots 7 made in the bottom of the wells 15. This water which is then contained in the trough 2 can resupply by capillarity the substrate contained on the tray when this substrate dries out.

When the terrain that is to be lawned exhibits an obstacle, such as a tree or a geological obstacle, the device will then be severed along the frangible regions of the tray 3 and of the trough 2 respectively.

Figure 7:
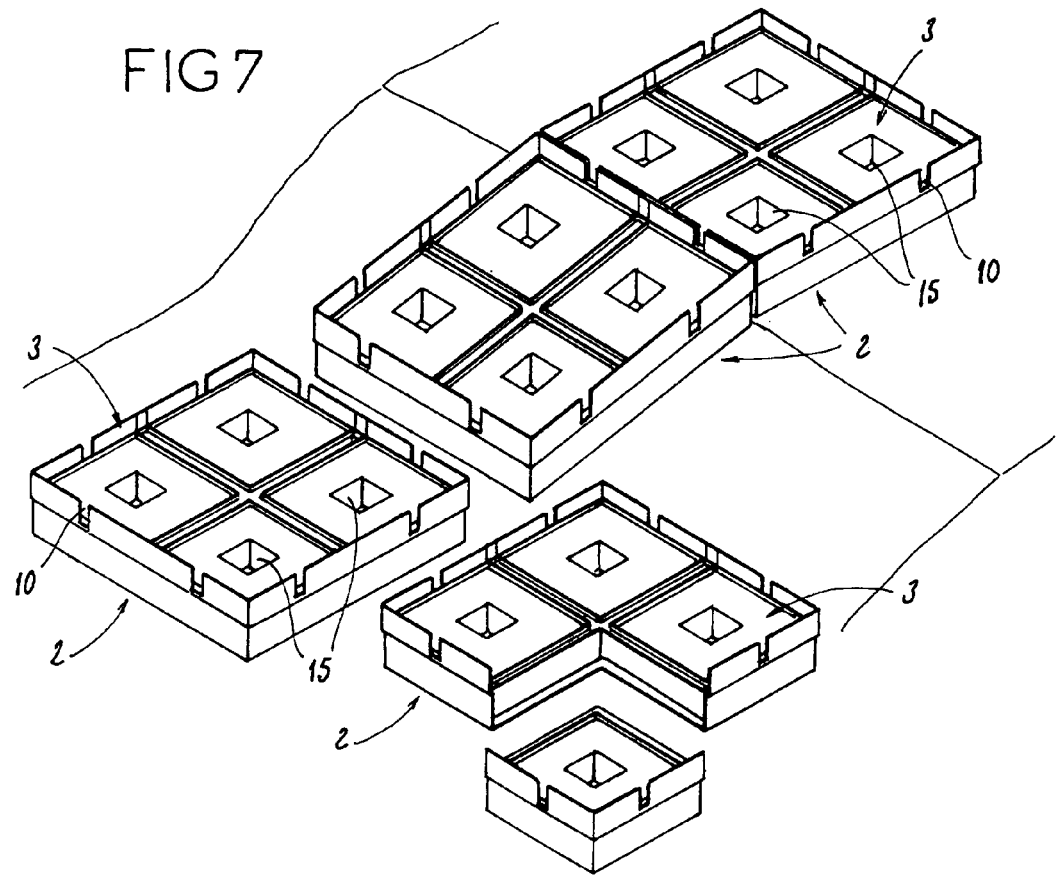
FIG. 7 depicts, in perspective, one possible implementation of the device with a store of water according to the invention.
Figure 2:
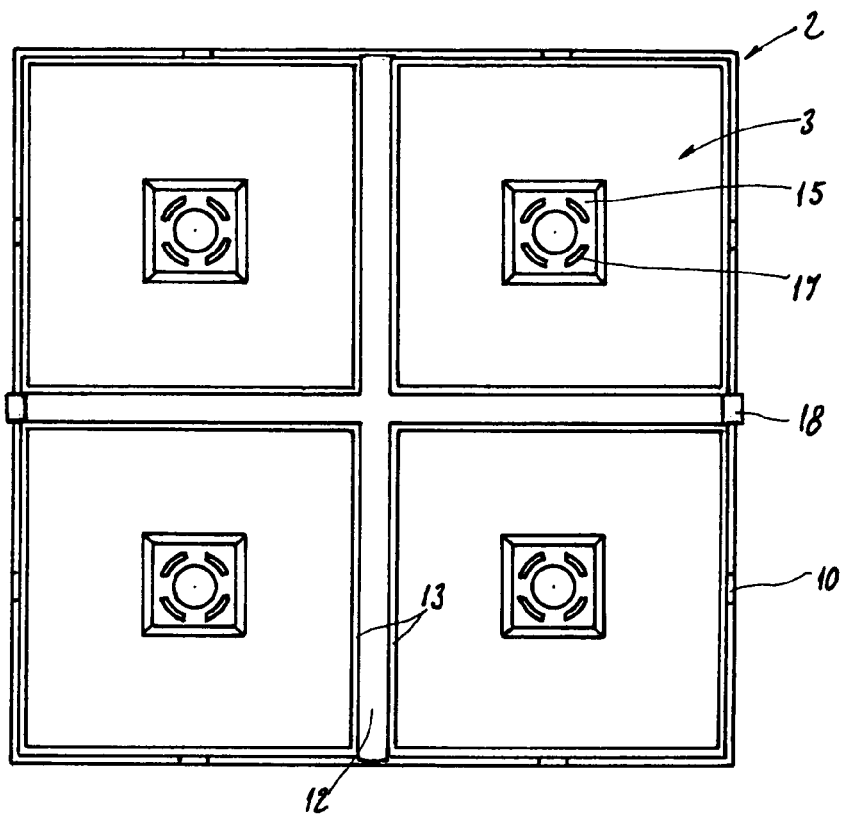
FIG. 2 depicts a view of the device from above.

As far as the trough 2 is concerned, it will be noted that, since the frangible region 7 thereof is delimited by two partitions 8, when this frangible region is severed as can be seen for example in FIG. 7, the device from which one element has been removed maintains its watertightness properties.

If the ground to be lawned is sloping, a variant embodiment of the trough 2 is provided in which the bottom wall 4 thereof makes an angle of less than 90° with one of its side walls so that the growing substrate retention capacity and the watering water retention capacity of the device are not adversely affected.

Thus, as can be seen in FIG. 7, the invention therefore proposes a device with a store of water for growing lawned surfaces which can be adapted to suit various lies of the land, on the one hand, while being able to be cut down so that the device can be adapted to suit obstacles that the surface being lawned may comprise and, on the other hand, be adapted to suit unevenness of the ground thereof.

Figure 5:
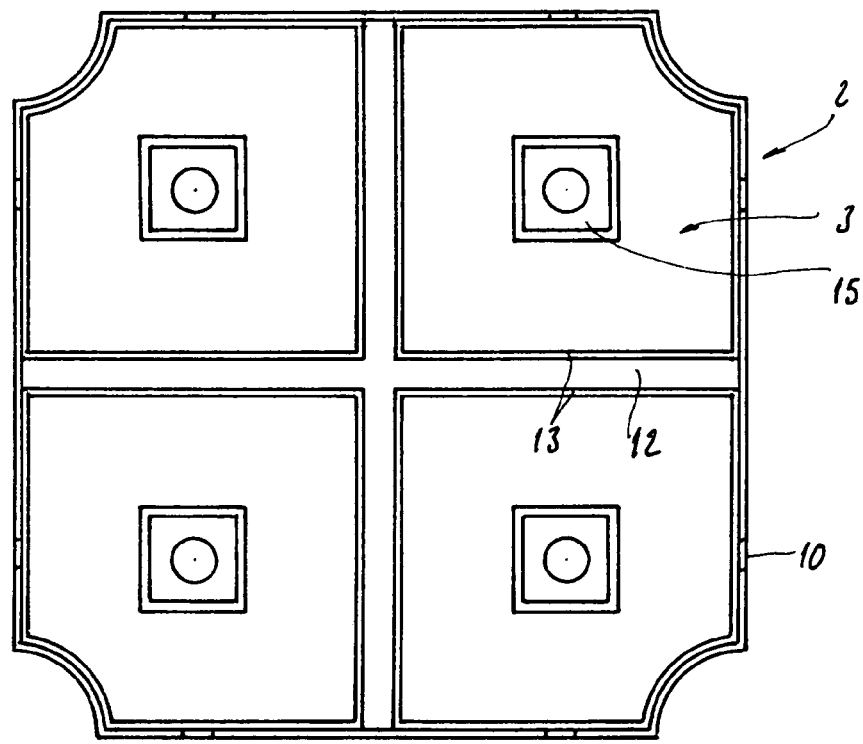
FIG. 5 depicts a view of one embodiment of this device, from above.
Figure 6:
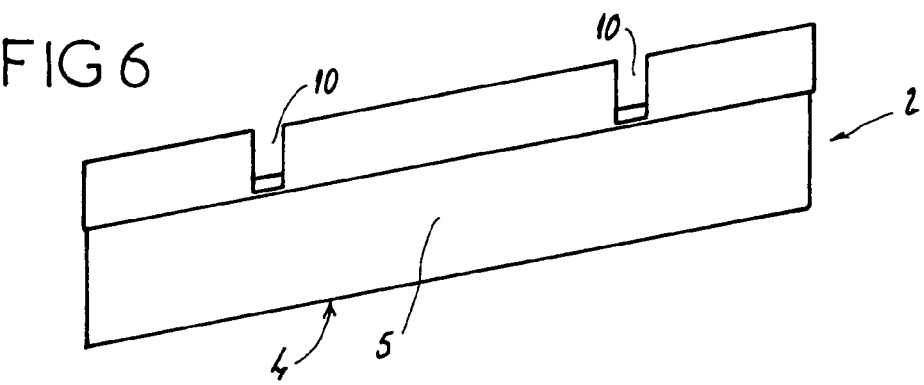
FIG. 6 depicts a side view of another embodiment of the device.

FIG. 5 illustrates an embodiment of the device in which the corners of the trough 2 and of the tray 3 are in the shape of an arc of a circle so that when the devices are placed in contact with one another, a tubular opening is formed between them. Via this tubular opening it is then possible to pass a spray nozzle which, by virtue of an opening formed in the bottom of the trough 2, allows water to be supplied directly to the trough 2.

The embodiment illustrated in FIG. 5 is particularly well suited to very hot areas in which evaporation is very high.

Figure 9:
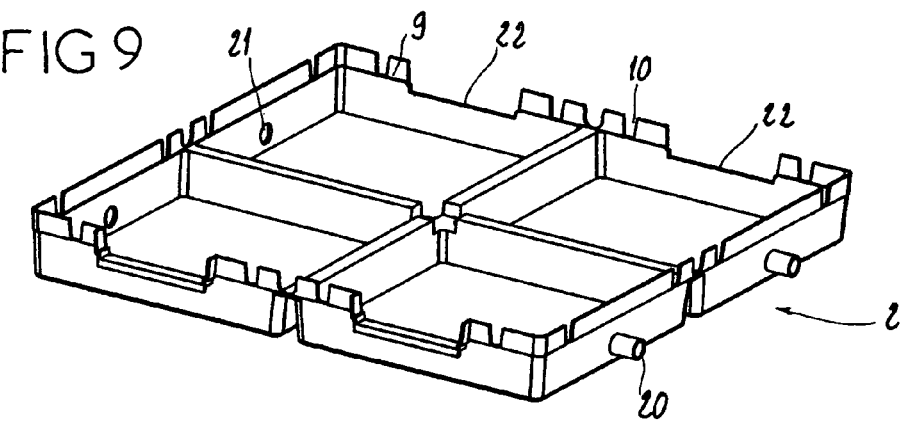

As can be seen in FIG. 9, the trough has, in one of its side walls, two nozzles 20 and, in its opposite wall to the latter, two openings 21 each equipped with a periphery seal able to accommodate the nozzle 20 when two troughs 2 are placed side by side. This characteristic allows water to communicate and circulate from one trough to another.

This figure also shows that the trough 2 has, in its side walls, cutouts 22 allowing water to communicate from one trough to another when two troughs 2 are side by side.

To manage the supply of water, there are several possible embodiments of the tray.

Figure 8:
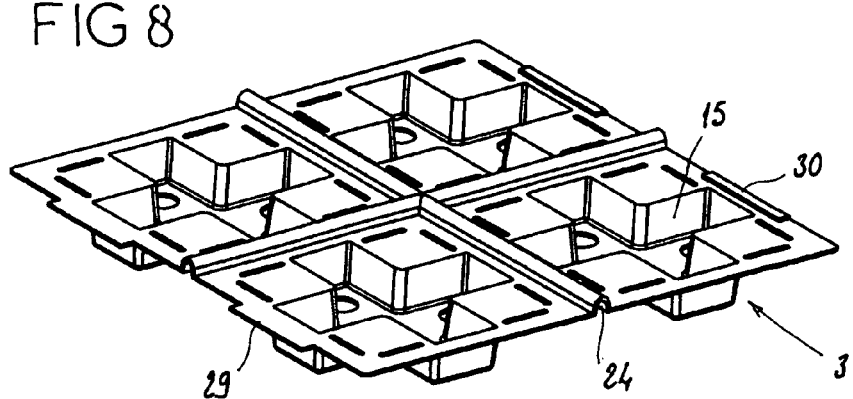

Referring to FIG. 8, it can be seen that the frangible region of the tray 3 consists of a U section 24 facing toward the trough and able to accept a water supply hose.

It is also envisaged for the frangible region of the tray 3 to consist of a pipe 25 of which the part facing the tray 2 has at least one hole (not visible in the drawing) and which allows the trough to be supplied with water.

Figure 11:
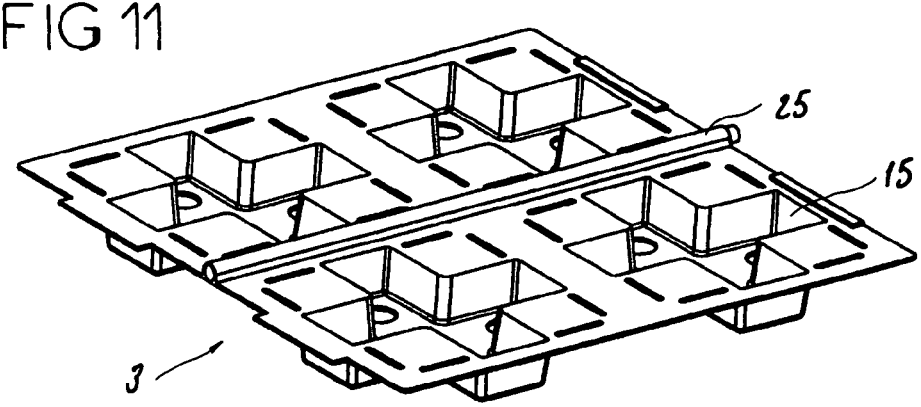
Figure 12:
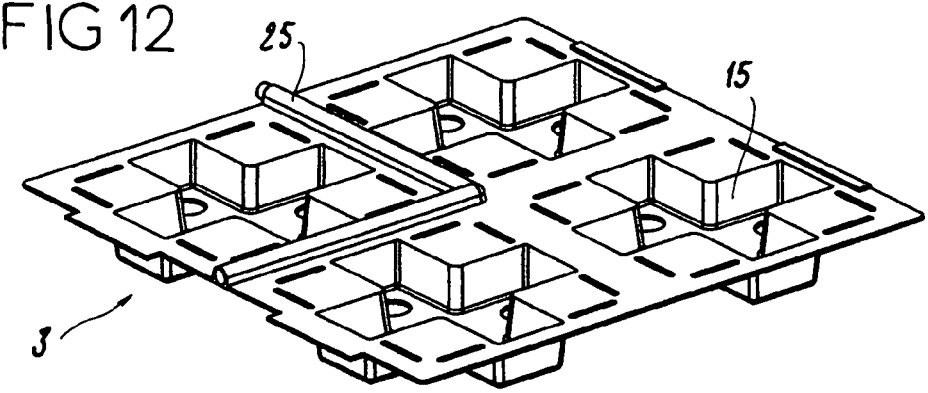
Figure 13:
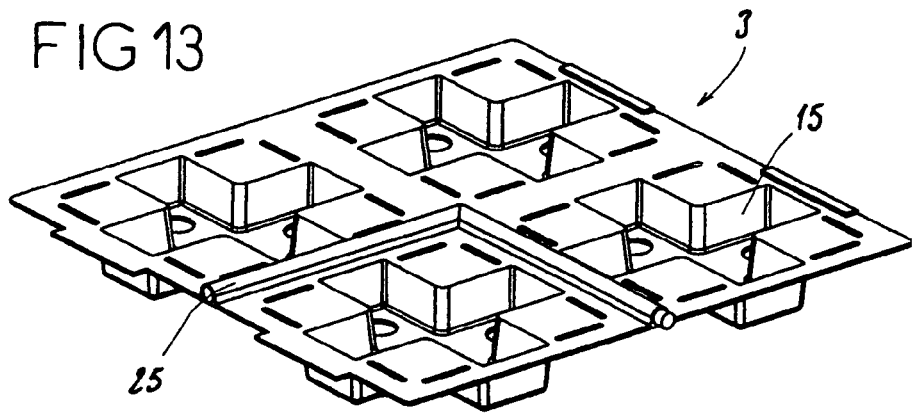

As can be seen in FIGS. 11 to 13, the pipe 25 connects the middles of the two opposite sides of the tray 3 or the pipe 25 connects the middles of the consecutive sides of the tray 3.

The tray 3 may also have two pipes 25 in the form of a cross, as shown in FIG. 14. A selection valve 26 is placed at the intersection of the pipes 25, allowing the flow of water to be directed.

In another embodiment illustrated in FIG. 14, the frangible region is delimited by ribs 26 on able to accept a cover 27 to delimit a water conveying duct. The cover 29 is equipped with couplings 31 to a water supply system.

Figure 10:
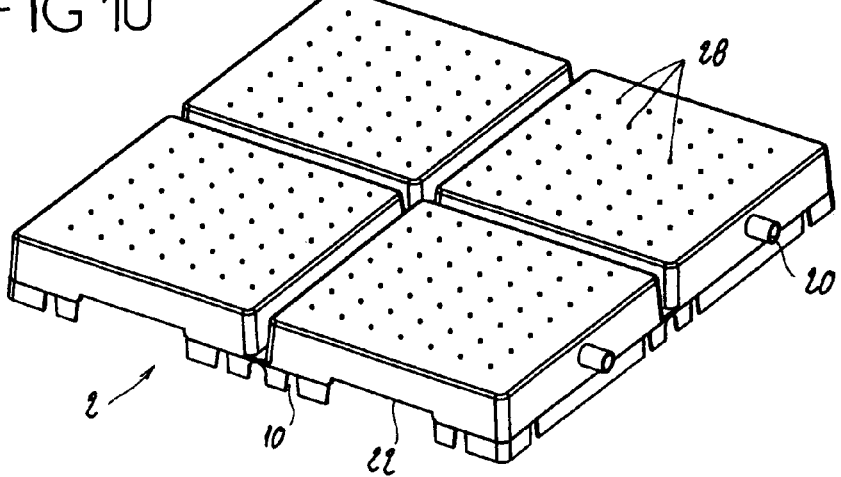

It will also be noted that for better positioning of the trough and therefore of the device, the underside of the trough is provided with spikes 28 as shown by FIG. 10.

Advantageously, the tray 3 has, on one of its sides, a male interlock feature 29 and, on its opposite side to the first, a female interlock feature 30 which makes it possible to prevent the growing substrate from dropping into the trough when the device is in operation.

The invention thus provides a device with a store of water having the numerous advantages indicated hereinabove.

It goes without saying that the invention is not restricted to the embodiments described hereinabove by way of nonlimiting example but on the contrary it encompasses all variant embodiments thereof.

The invention claimed is:

1. A device with a store of water for growing a lawned surface, comprising:
   a trough having a bottom wall, side walls, and a plurality of sections, so as to allow said trough to contain a liquid; and
   a tray having a plurality of sections fitting into the trough, each section being configured to support a growing substrate while nested within said trough, and having at least one well with a bottom surface, the well communicating with the liquid contained in the trough, each section of the tray including a substantially flat portion surrounding a relatively upper portion of the at least one well,
   wherein the trough includes a frangible region between the sections and delimited by vertical partitions extending from the bottom wall, and the tray includes a frangible region between the sections and delimited by ribs traversing the tray and extending from said substantially flat portion over a lesser height than said partitions, said tray including a different geometry from said trough via at least a differences between respective positions and extents of said partitions and said ribs on said trough and said tray, wherein the vertical partitions and ribs create boundaries along the frangible regions of the trough and the tray respectively, the boundaries of the trough and the tray being in continuous alignment across and entire width of the tray, wherein the partitions and the ribs are disposed in substantial vertical alignment with each other, the frangible regions of the trough and the tray are disposed in substantial vertical alignment with each other, and a severing of the frangible regions divides the sections of the tray and trough from the device, wherein the trough has, in the side walls, a shoulder placed at a height equal to that of the partitions, and against which a periphery of the tray rests, and wherein at least one notch is made in a peripheral rim of the trough.

2. The device with a store of water as claimed in claim 1, wherein the bottom wall of the trough makes an angle of less than 90° with one of the side walls of the tray when said one of the side walls is disposed in said trough.

3. The device with a store of water as claimed in one of claim 1, wherein the sections of the trough have a square shape exhibiting two frangible regions connecting middles of two opposite sides of the trough.

4. The device with a store of water as claimed in claim 1, wherein at least one clip is fitted over the upper part of the wall, the clip resting against the tray.

5. The device with a store of water according to as claimed in claim 1, wherein slots are pierced in a bottom wall of the well.

6. The device with a store of water as claimed in claim 1, wherein the frangible regions of the tray are supported by the by the partitions of the trough at an area of the substantial vertical alignment between the partitions and the ribs.

7. The device with a store of water as claimed in claim 1, wherein the substantially flat portion surrounding the well includes a greater surface area than a bottom surface of the well, said tray including a different geometry from said trough additional to said partitions and ribs via at least a presence of said substantially flat portion.

8. A device with a store of water for growing a lawned surface, comprising:

a trough having a bottom wall, side walls, and a plurality of sections, so as to allow said trough to contain a liquid, and a tray having a plurality of sections fitting into the trough, each section being configured to support a growing substrate while nested within said trough and having at least one well with a bottom surface, the well communicating with the liquid contained in the trough, each section of the tray including a substantially flat portion surrounding a relatively upper portion of the at least one well, wherein the trough includes a frangible region between the sections and delimited by vertical partitions extending from the bottom wall, and the tray includes a frangible region between the sections and delimited by ribs traversing the tray and extending from said substantially flat portion over a lesser height than said partitions, said tray including a different geometry from said trough via at least a differences between respective positions and extents of said partitions and said ribs on said trough and said tray, wherein the vertical partitions and ribs create boundaries along the frangible regions of the trough and the tray respectively, the boundaries of the trough and the tray being in continuous alignment across and entire width of the tray, wherein the partitions and the ribs are disposed in substantial vertical alignment with each other, the frangible regions of the trough and the tray are disposed in substantial vertical alignment with each other, wherein the trough has a shoulder disposed entirely at an interior of the side walls and at a height below the side walls and substantially equal to that of the partitions, and against which a periphery of the tray rests, a periphery the substantially flat portion of the well of the tray resting against the internal shoulder, and wherein a severing of the frangible regions divides the sections of the tray and trough from the device at the height of the shoulder and partitions wherein the trough has, in the side walls, a shoulder placed at a height equal to that of the partitions, and against which a periphery of the tray rests, and wherein at least one notch is made in a peripheral rim of the trough.

9. The device with a store of water as claimed in claim 8, wherein said at least one notch crosses through an upper part of the side walls of the trough above the internal shoulder.

10. The device with a store of water as claimed in claim 8, wherein the substantially flat portion surrounding the well includes a greater surface area than a bottom surface of the well, said tray including a different geometry from said trough additional to said partitions and ribs via at least a presence of said substantially flat portion.

* * * * *